Figure 1:
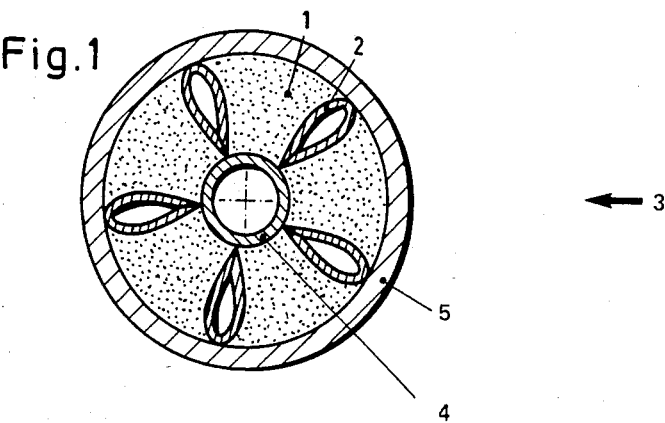

United States Patent [19]

Wessel

[11] Patent Number: 4,598,836
[45] Date of Patent: Jul. 8, 1986

[54] PRESSURE GAS CONTAINER

[75] Inventor: Otto Wessel, Duisburg, Fed. Rep. of Germany

[73] Assignee: Mannesmann Aktiengesellschaft, Dusseldorf, Fed. Rep. of Germany

[21] Appl. No.: 660,200

[22] Filed: Oct. 12, 1984

[30] Foreign Application Priority Data

Oct. 24, 1983 [DE] Fed. Rep. of Germany ....... 3338879

[51] Int. Cl.[4] ............................................. B65D 25/00
[52] U.S. Cl. .................................... 220/3; 220/88 R; 206/0.7; 34/15
[58] Field of Search .................. 206/0.7; 220/3, 85 S, 220/88 R, 900; 34/15

[56] References Cited

U.S. PATENT DOCUMENTS

| | | | |
|---|---|---|---|
| 4,133,426 | 1/1979 | Turillon et al. | 220/3 X |
| 4,134,491 | 1/1979 | Turillon et al. | 220/88 R X |
| 4,187,092 | 2/1980 | Woolley | 34/15 X |
| 4,383,606 | 5/1983 | Hunter | 220/88 R X |
| 4,489,564 | 12/1984 | Häusler et al. | 34/15 X |

Primary Examiner—Steven M. Pollard
Attorney, Agent, or Firm—Cullen, Sloman, Cantor, Grauer, Scott & Rutherford

[57] ABSTRACT

A pressure gas container of a predetermined volume for the storage of hydrogen on the basis of a gas/solid reaction and which is filled with a storage material, characterized in that at least one compressible impervious elastic element is enclosed within the storage material and is adapted to have its volume compressed by a pressure action by the storage material.

12 Claims, 5 Drawing Figures

PRESSURE GAS CONTAINER

The invention relates to a pressure gas container for the storage of hydrogen on the basis of a gas/solid reaction.

It is known to store hydrogen in a container which is filled with a powdered storage material made of a hydride-forming metal. The hydrogen is taken up to a certain extent by the storage material in an exothermal operation. The discharging of the container is carried out by applying heat to the storage material, whereby the hydrogen is released again. The taking-up of the hydrogen by the storage material involves a marked increase in volume of the storage material. Especially in the case of pressure gas containers for mobile use this often results in plastic deformation of the container envelope after several charging and discharging operations. This phenomenon occurs even where when the container is filled with the storage material a part-volume of the container is left free for the expansion of the storage material. The reason for this is that after several charging and discharging operations and as a result of shaking the powdered storage material becomes so much consolidated that it cannot fill the expansion volume which per se is available, and instead acts with high pressure on the container wall and causes plastic deformation of the latter. But for safety reasons such deformation phenomena are not allowable, especially in pressure gas storage vessels for mobile use (vehicle tanks). Several proposals have already been made to solve this problem.

For example it was proposed in European Pat. No. 00 16 576 to arrange the storage material within the container on tray-like receptacles stacked in tiers above one another. In that case the storage material is arranged preferably in trough-shaped recesses on the individual trays, the cross-section of such recesses widening conically in the upward direction. When the container is charged with hydrogen the storage material can expand into the spaces formed between the individual tiers.

A disadvantage of this proposed solution is that the user has to tolerate a relatively considerable amount of dead space, that is to say space which cannot be used for hydrogen storing, and that when the pressure gas container is in mobile use e.g. in a vehicle, the possibility cannot be excluded that jerky movements of the vehicle will throw the storage material out of the recesses provided on the tray, and that it will concentrate at certain places. This again can cause the undesirable plastic deformation phenomena in the pressure gas container.

German specification as laid open for public inspection 29 06 642 describes a pressure gas container for the storing of hydrogen, containing numerous smaller containers into which the actual storage material is put. Within the smaller containers again an empty volume is left for the expansion of the storage material. With this solution likewise it can happen that the storage material becomes consolidated within the smaller containers, resulting in plastic deformation of these smaller containers and thus in some circumstances corresponding deformation of the outer container. In addition, the production of such a pressure gas container involves considerable outlay, and does not give the optimum results as regards minimising weight and volume.

Furthermore from German specification as laid open for public inspection 31 48 307 a method if known for the charging of pressure gas containers for the storage of hydrogen wherein the introduction and packing of the storage material in the container are effected with the use of external support for the container wall (e.g. using a jig). This external support for the container wall, which is also maintained when charging with hydrogen, prevents plastic deformation of the container wall and on the other hand results in consolidation of the storage material within the container. If this external support is not provided at each charging operation, especially in the event of mobile use of the pressure gas container the possibility cannot be excluded that the storage material consolidated at the first charging with hydrogen will collapse again during discharging, so that at the next charging operation plastic deformation of the container can occur in the manner described.

Finally it is known from European Pat. No. 00 56 724 to provide a pressure gas container for hydrogen wherein the individual particles of the storage material are embedded in a matrix of porous synthetic plastic material filling the container volume. This prevents the storage material collecting at specific places and becoming packed and consolidated there, to result in unallowable plastic deformation of the pressure gas container when a charging operation is carried out. In addition to the costly production of the synthetic plastic material matrix, the considerable space requirements and the limited possibilities of use for this storage container are also disadvantages. Since the matrix for the embedding of the actual storage material consists of synthetic plastic material, in fact, the limited temperature stability of synthetic plastic materials imposes narrow limits on the storage materials which are to be used. Thus it is not possible to use storage materials with which the charging and discharging operations are carried out at high temperatures (e.g. 700° C.).

Therefore the invention has as its object to provide a pressure gas container for the storage of hydrogen on the basis of a gas/solid reaction which is simple to manufacture, is not subject to any substantial restrictions regarding the storage materials to be used, and which, when it is charged with hydrogen, does not require the taking of special precautions for preventing plastic deformation of the container wall as a result of the volume expansion of the storage material.

This object is achieved with a pressure gas container with the features characterised in claim 1. Advantageous further features of the pressure gas container are indicated in the subordinate claims 2-11.

The invention is based on the idea of obviating local shifting of the powdered storage material by filling the volume of the pressure gas container with storage material at all times, no spaces forming in the container interior, even at complete discharging, into which storage material could penetrate. For this purpose all of the storage material is always to be under at least a small mechanical pressure (compressive preloading) even in the discharged state.

But at the same time it is necessary to provide the expansion space required for the change in volume of the storage material. This is ensured by embedding one or more volume-compressible elastic elements in the storage material. By a volume-compressible elastic element there is understood an element which decreases in volume under the action of external pressure and, when relieved of pressure, correspondingly increases its volume again elastically.

In the non-charged state the storage material occupies the volume $V_1$ in the pressure gas container, whereas the proportion of volume occupied by the elastic element or elements amounts to V2. The pressure gas container is completely filled with solids. When the pressure gas container is charged with hydrogen the volume of the storage material increases to the amount V1', whereas the volume of the elastic element or elements is reduced to the amount V2' under the pressure of the swelling storage material. The following equation obtains: $V1 + V2 = V1' + V2'$. Thus the pressure gas container is completely filled with solid materials even in the charged state.

Of course gas-filled spaces still exist between the particles of the storage material for gas exchange in every charged state of the pressure gas container; but these need not be considered specially in this discussion, since their size in each case is so small that even the smallest grains of storage material cannot penetrate into them; their volume is included here in the volume of the storage material.

When the pressure gas container is charged, the volume of the storage material decreases again, so that its pressure on the elastic elements decreases and these can expand again. As a result it is ensured that at no time during charging and discharging of the pressure gas container will spaces form in the interior of the container which are not filled with solids. Thus undesirable shifting of the storage material and corresponding concentrations of such material at specific places are obviated, together with the risk of plastic deformation of the pressure gas container involved therewith.

To obtain a particularly good compensation effect for the volume changes of the storage material it is advantageous to arrange a plurality of elastic elements in the pressure gas container. The elastic elements may be constructed as hollow elements e.g. as hollow balls.

It is particularly advantageous to use elastic elements whose outer walls are made of metal, since metals are all good conductors of heat, and good conduction of heat from the outside into the container interior facilitates the charging and discharging of the pressure gas container. The elasticity of an elastic element constructed as a hollow body can be achieved e.g. by a mechanical compression spring in the interior of the hollow body. In a preferred embodiment of the invention the elastic elements constructed as hollow bodies are filled with a medium (e.g. acetone, methanol, propane, or butane) which is liquid at the pressures and temperatures prevailing when charging the pressure gas container, and gaseous at the pressures and temperatures prevailing in the discharging phase. At discharging, lower pressures and higher temperatures occur than those occurring at charging. The liquefaction of the medium at charging assists the tendency of the elastic element towards volume reduction, whereas during discharging the transition of the medium to the gaseous phase assists the desired volume expansion of the elastic element. If there is used as the storage material a material with which neither the charging operation nor the discharging operation results in high temperatures (e.g. max. 100° C.), advantageously elastic elements made of a foam plastic with closed pores can be arranged in the interior of the pressure gas container.

Especially when hollow balls are used as elastic elements it is advantageous to have these in a random arrangement in the pressure gas container. This results in particularly simple production of the pressure gas container. In a preferred embodiment the elastic elements have an elongated extended form externally and are aligned parallel to the longitudinal axis of the pressure gas container. The length of the elastic elements corresponds in each case approximately to the length of the pressure gas container. This arrangement is advisable if the pressure gas container is aligned with its longitudinal axis horizontal in the operating state. If on the contrary the pressure gas container is to be operated with its longitudinal axis preferably vertical, it is recommended that the elastic elements are made disc-shaped and are arranged at a spacing from one another along the longitudinal axis of the pressure gas container.

The elastic elements should be so constructed that they completely fill the crosssection area of the pressure gas container in each case. As a result the pressure gas container is divided into volume portions which are situated axially one behind the other and which are filled with storage material. So that hydrogen can flow through the individual volume portions, a porous gas tube or alternatively an appropriate porous rod-shaped solid element is arranged coaxially in the interior of the pressure gas container. To improve the flow of heat, of which at a charging operation is directed from the interior of of the pressure gas container outwardly and at a discharging operation into the interior of the pressure gas container, it is advantageous to provide the elastic elements externally with flat prolongations which abut on the inner surface of the wall of the pressure gas container. A further improvement in the heat exchange which takes place with the environment is obtained if the elastic elements are formed at least in the region of their surface, including the flat prolongations, of a material of high thermal conductivity.

In many cases it will be advantageous to couple a plurality of pressure gas containers according to the invention to one another and to form a hydrogen store therefrom. The cross-section of the pressure gas container can, incidentally, be of any desired shape, e.g. circular, hexagonal etc.

Figure 2:
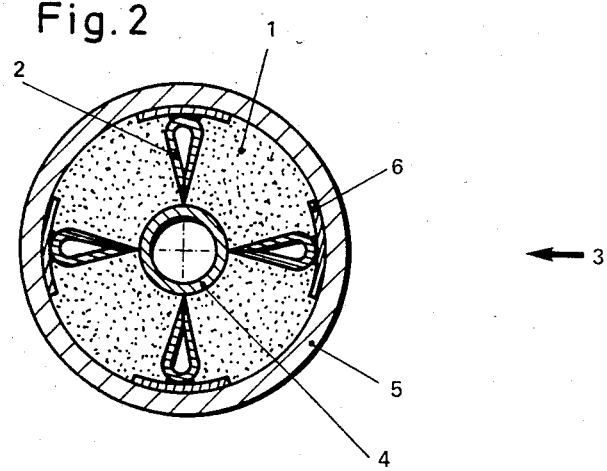
Figure 3:
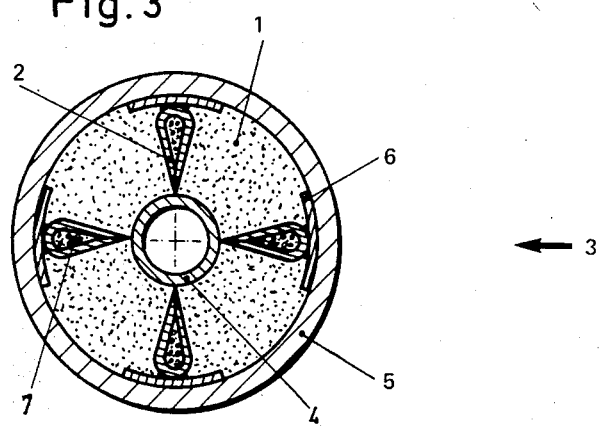
Figure 4:
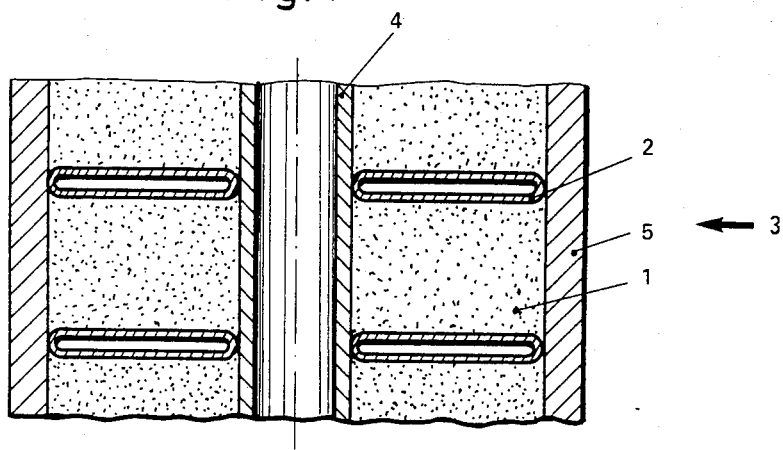
Figure 5:
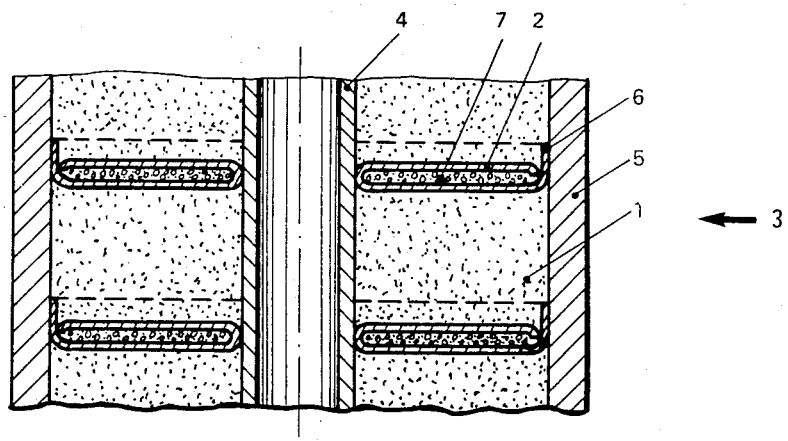

The invention will be explained in more detail hereinafter with the help of some examples of embodiment. In the drawings:

FIG. 1 shows a cross-section through a pressure gas container with longitudinally arranged elastic elements which are constructed as hollow bodies, FIG. 2 shows a cross-section through a pressure gas container with longitudinally arranged elastic elements which are constructed as hollow bodies and are provided with flat prolongations, FIG. 3 shows a cross-sectional through a pressure gas container with longitudinally arranged elastic elements which are constructed as hollow bodies filled with foam plastic and are provided with flat prolongations, FIG. 4 shows a longitudinal section through a pressure gas container with disc-shaped elastic elements which are constructed as hollow bodies and are aligned transversely relatively to the container axis, FIG. 5 shows a longitudinal section through a pressure gas container with disc-shaped elastic elements provided with flat prolongations abutting internally on the container wall, and with a filling of elastic foam plastic.

The pressure gas container 3 shown in cross-section in FIG. 1 comprises a total of five flat elastic elements 2 which extend along the container axis and which are constructed as hollow bodies. The elastic elements 2 extend over the entire length of the pressure gas container 3 and contact its cylindrical shell 5 internally along a generatrix. Likewise they contact the porous gas tube 4 situated coaxially with the container axis along a generatrix. As a result the container interior is divided into five compartments each formed between two elastic elements 2, the container wall 5 and the gas tube 4. These compartments are each filled completely with storage material 1.

When the pressure gas container 3 is charged with hydrogen the storage material 1 expands and in so doing presses on the elastic elements 2. These yield to the external pressure, and reduce their volume. Whilst taking their compressibility into account, the volume of the elastic elements 2 is so dimensioned that even in the fully charged state of the pressure gas container they can take up the volume change occurring in the storage material 1 without the storage material 1 subjecting the container wall 5 to a pressure which would lead to plastic deformation of the container wall 5. When the pressure gas container 3 is discharged the storage material 1 shrinks again. The pressure on the elastic elements 2 decreases, so that they expand again. Thus the shrinking of the storage material 1 does not lead to the forming of hollow spaces in the interior of the container. This obviates movement of storage material 1 possibly as a result of external shaking effects on the pressure gas container 3, resulting in concentration of such material at certain places, becoming compacted there, and causing plastic deformation of the container wall 5 at the next charging operation.

The example of embodiment in FIG. 2, which is also shown in cross-section, comprises four elastic elements 2, which again are constructed as hollow bodies, but differ from the pressure gas container shown in FIG. 1 in that they are provided externally with flat prolongations 6. These flat prolongations 6 abut on the container wall 5 at the inner side of the pressure gas container 3. The surface of the elastic elements 2 including the flat prolongations 6 is made of a material of good thermal conductivity. This substantially facilitates heat exchange with the storage material 1.

FIG. 3 shows a similar form of embodiment to that of FIG. 2. Here the elastic elements 2, which likewise are constructed as hollow bodies, are filled inside with an elastic foam plastic.

Whereas pressure gas containers are shown in FIGS. 1 to 3 which are suitable primarily for operation in horizontal positions, FIGS. 4 and 5 show in longitudinal section two containers which are intended for upright operation, i.e. with the container axis vertically situated.

The elastic elements 2 in FIG. 4 are constructed as disc-shaped hollow bodies which are arranged at intervals along the axis of the pressure gas continer 3. The elastic elements 2 extend radially over the entire space between the gas tube 4 and the outer wall 5 of the pressure gas container 3. In this way a partitioned-off part-volume or compartment is formed in each case within the pressure gas container 3 between each two elastic elements 2. Each of these compartments is filled completely with storage material 1. By way of a difference relatively to the pressure gas containers shown in FIGS. 1-3, wherein the storage material 1 can expand in the peripheral direction of the pressure gas container 3, in FIG. 4 the expansion of the storage material 1 when the container is charged with hydrogen takes place in the axial direction.

The pressure gas container shown in FIG. 5 differs from FIG. 4 in that it has elastic elements 2 which are provided externally with flat projections or prolongations 6, which abut on the container wall 5 internally.

Corresponding to the example of embodiment shown in FIG. 3, here again the hollow interiors of the elastic elements 2 are filled with an elastic foam plastic 7.

I claim:

1. A pressure gas container of a predetermined volume for the storage of hydrogen on the basis of a gas/solid reaction and which is filled with a storage material, characterized in that at least one compressible impervious elastic element is enclosed within the storage material and is adapted to have its volume compressed by a pressure action by the storage material (1) and which is made of a material which is stable at the temperatures occurring when the pressure gas container (3) is charged with hydrogen and discharged said elastic element being so embedded in the storage material and the container volume is completely filled with the storage material when in a gas charged and discharged state.

2. A pressure gas container according to claim 1, characterized in that a plurality of elastic elements (2) are embedded in the storage material.

3. A pressure gas container according to claims 1 or 2, characterized in that each elastic element (2) is hollow.

4. A pressure gas container according to claim 3, characterized in that the outer walls of each elastic element is of metal material.

5. A pressure gas container according to claim 3 or 4, characterized in that each elastic element is filled with a medium which is liquid under the conditions of pressure and temperature corresponding to charging the pressure gas container with hydrogen and gaseous under the conditions corresponding to discharging the pressure gas container.

6. A pressure gas container according to claims 1 or 2, characterized in that each elastic element is constructed of form plastic material with closed pores.

7. A pressure gas container according to one of claims 2–6, characterized in that the elastic elements are in a random arrangement.

8. A pressure gas container according to one of claims 1–6, characterized in that the elastic elements have an elongated extended form, are aligned parallel to the longitudinal axis of the pressure gas container (3), and their length corresponds to the length of the pressure gas container.

9. A pressure gas container according to claim 2, or according to claim 2 and one of claims 3–6, characterized in that the elastic elements (2) are constructed as disc-shaped elements with a cross sectional form corresponding to the cross section area of the space between the inner surface of the wall (5) of the pressure gas container (3) and the outer surface of a gas tube (4) coaxially positioned on the interior of the pressure gas container and are spaced from one another along the axis of the pressure gas container.

10. A pressure gas container according to one of claims 1–5 or 8–9, characterized in that the elastic elements (2) are formed at least in their surface region of a material having high thermal conductivity.

11. A pressure gas container according to claim 10, characterized in that the elastic elements (2) have external flat prolongations (6) which abut and extend along the inner surface of the wall of the pressure gas container (5).

12. A pressure gas container of a predetermined volume for the storage of hydrogen on the basis of a gas/solid reaction and which is filled with a storage material, characterized in that at least one compressible impervious elastic element is enclosed within the storage material and is adapted to have its volume compressed by a pressure action by the storage material (1) and which is made of a material which is stable at the temperatures occurring when the pressure gas container (3) is charged with hydrogen and discharged, said elastic element being so embedded in the storage material and the container volume is completely filled with the storage material when in a gas charged and discharged state; further characterized in that a plurality of elastic elements (2) are embedded in the storage material; further characterized in that the elastic elements (2) are constructed as disc-shaped elements with a cross sectional form corresponding to the cross section area of the space between the inner surface of the wall (5) of the pressure gas container (3) and the outer surface of a gas tube (4) coaxially positioned on the interior of the pressure gas container and are spaced from one another along the axis of the pressure gas container.

* * * * *

UNITED STATES PATENT OFFICE
CERTIFICATE OF CORRECTION

Patent No. 4,598,836  Dated  July 8, 1986

Inventor(s)  Otto Wessel

It is certified that error appears in the above-identified patent and that said Letters Patent are hereby corrected as shown below:

Claim 6, line 3, "form" should read -foam-.

Signed and Sealed this

Twentieth Day of January, 1987

Attest:

DONALD J. QUIGG

Attesting Officer   Commissioner of Patents and Trademarks